Feb. 20, 1934.  W. L. McNAMARA  1,947,609
VESSEL TRANSFERRING MECHANISM
Filed Feb. 21, 1928  4 Sheets-Sheet 1
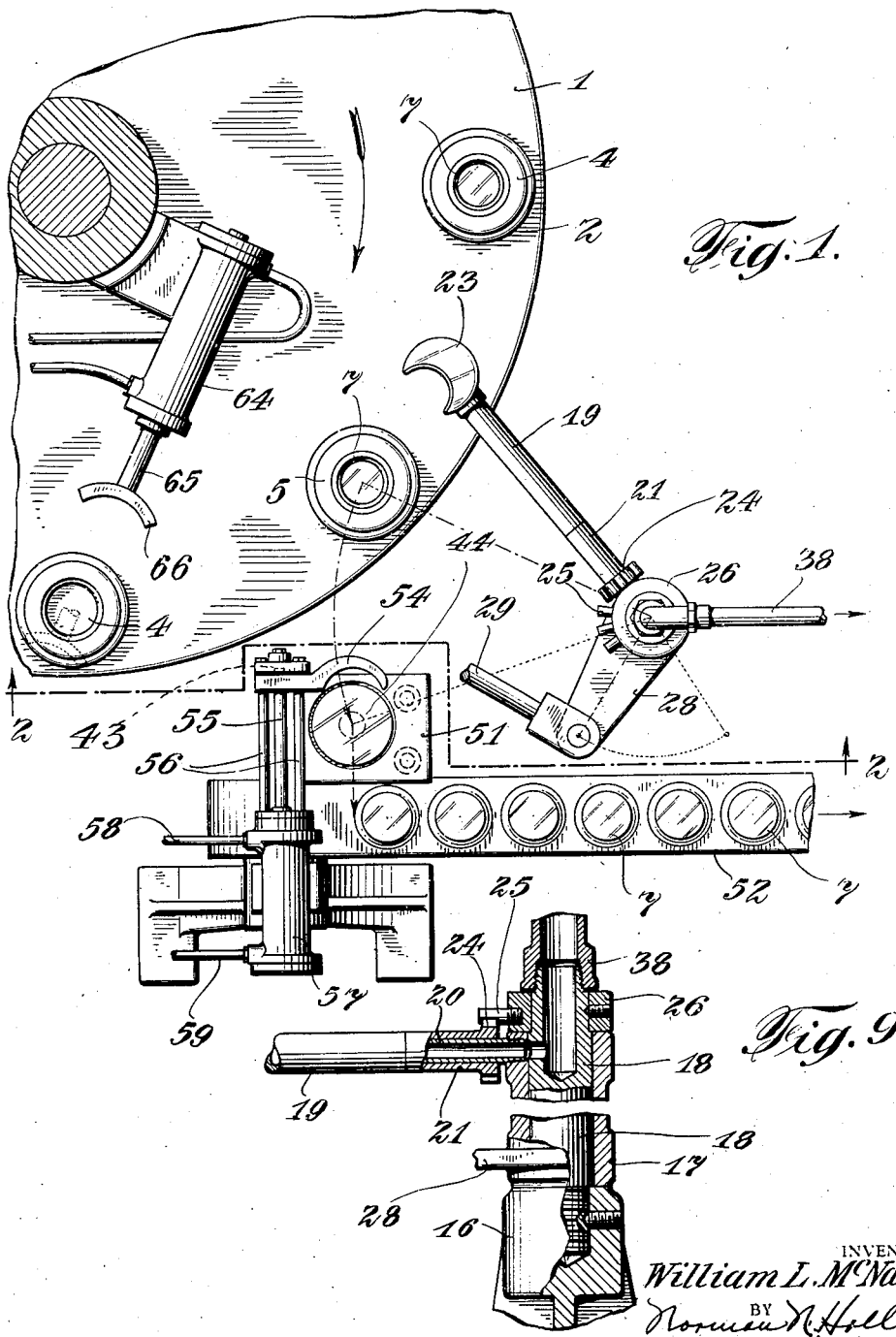
INVENTOR
William L. McNamara
BY Norman N. Holland
his ATTORNEY Feb. 20, 1934.    W. L. McNAMARA    1,947,609
VESSEL TRANSFERRING MECHANISM
Filed Feb. 21, 1928    4 Sheets-Sheet 2
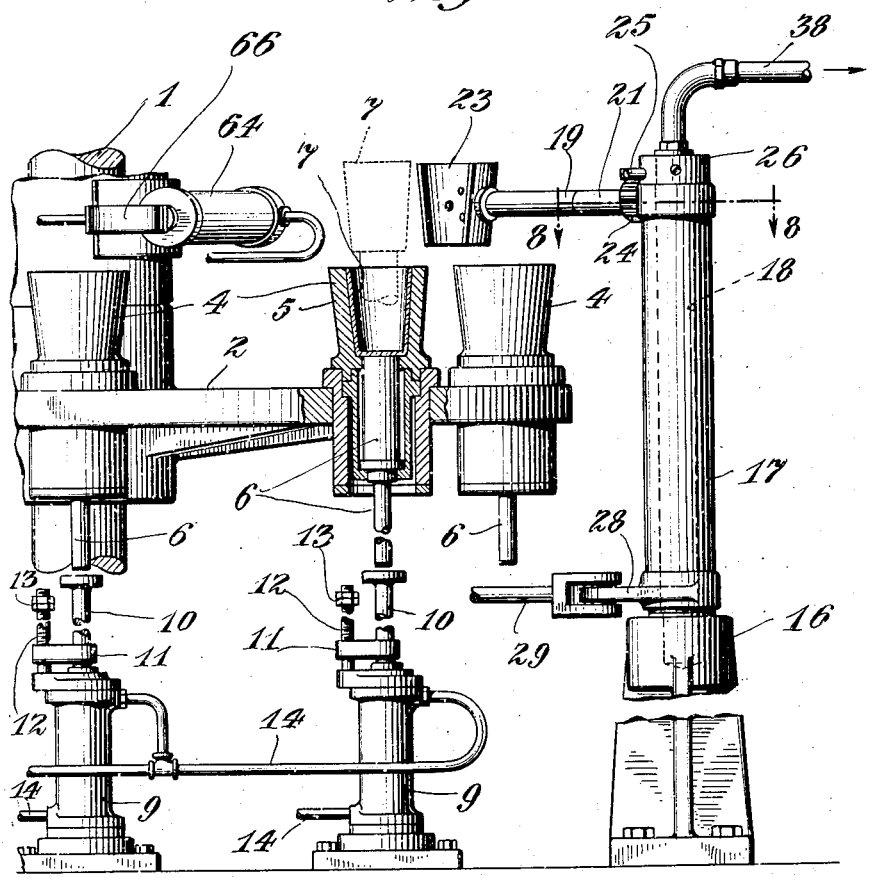
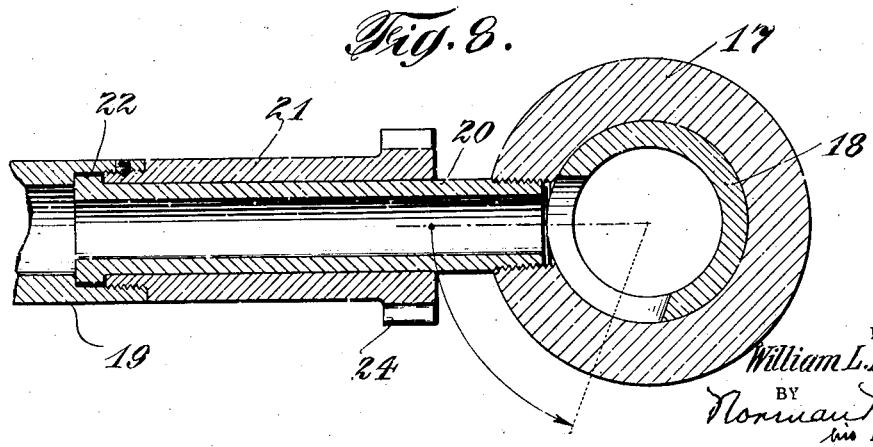

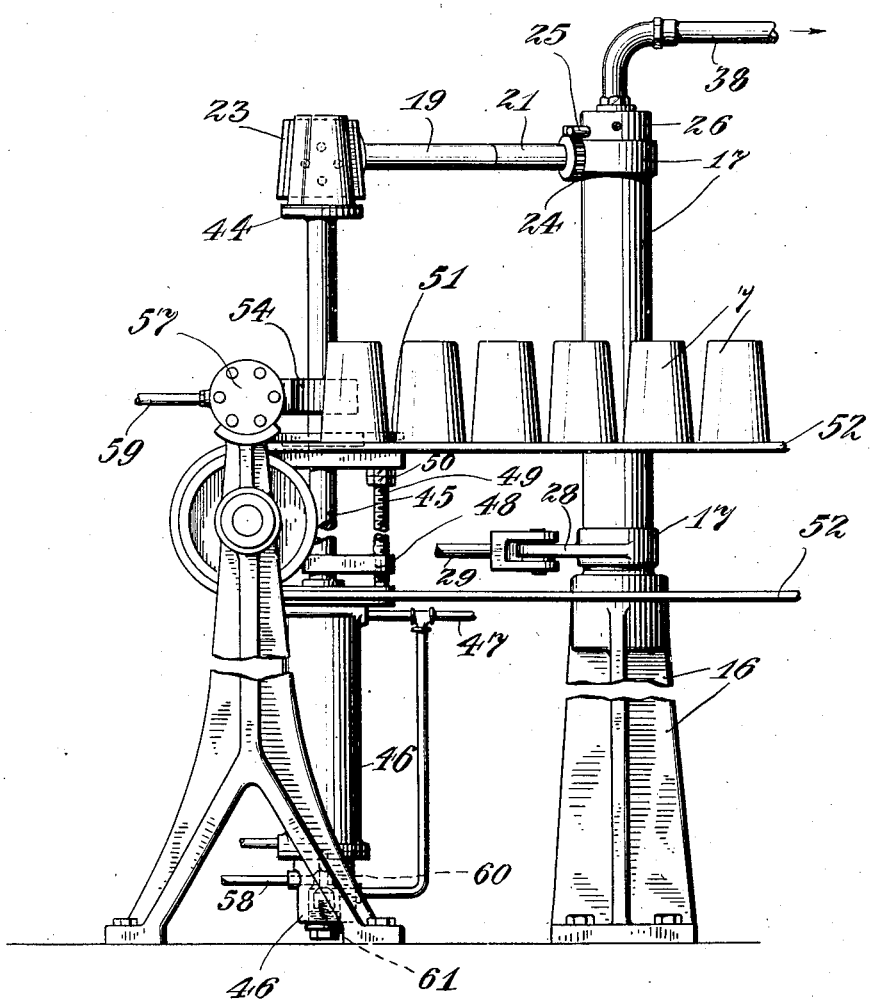
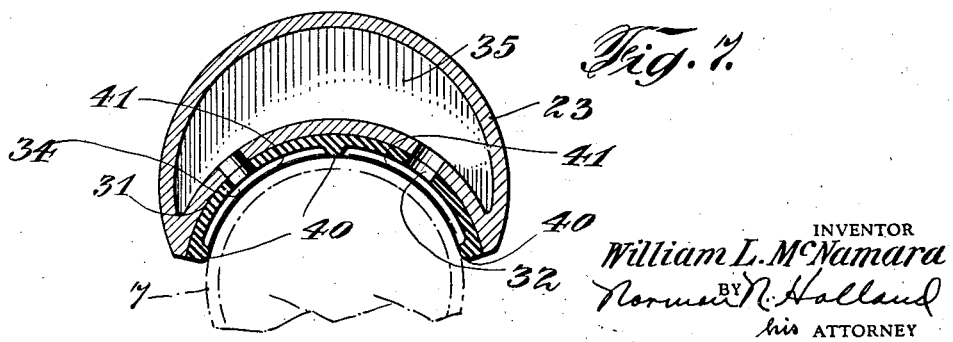

Feb. 20, 1934.    W. L. McNAMARA    1,947,609
VESSEL TRANSFERRING MECHANISM
Filed Feb. 21, 1928    4 Sheets-Sheet 4
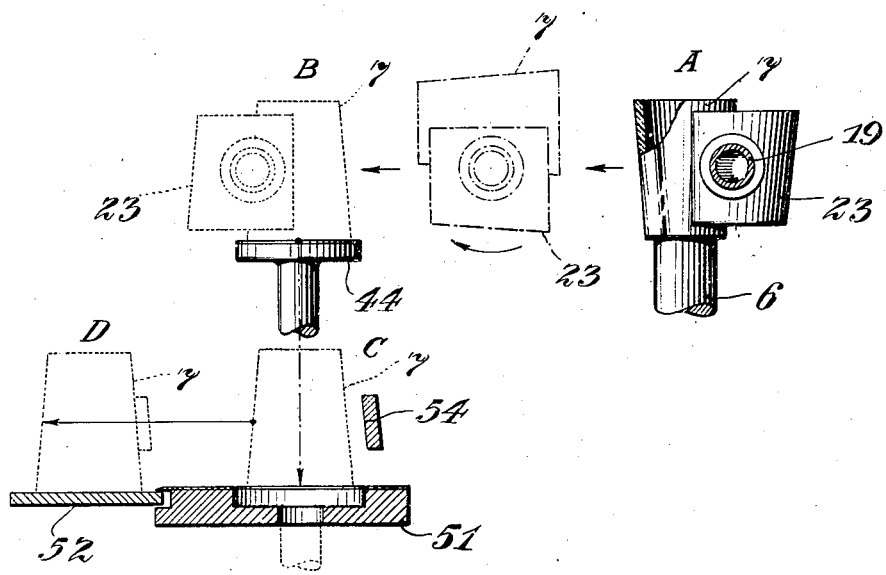
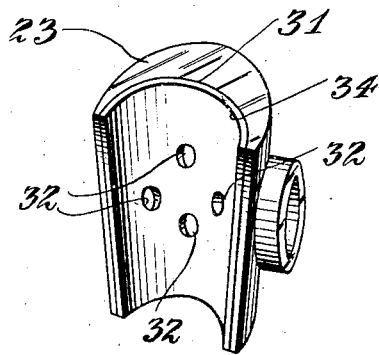
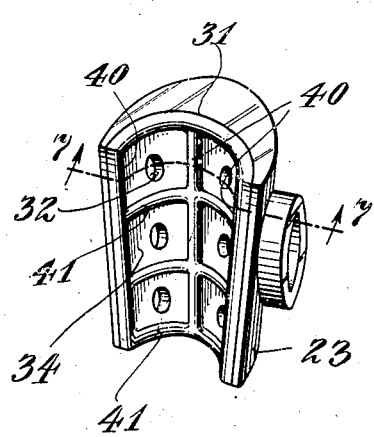
INVENTOR
William L. McNamara
BY
his ATTORNEY Patented Feb. 20, 1934

1,947,609

UNITED STATES PATENT OFFICE 1,947,609

VESSEL TRANSFERRING MECHANISM

William L. McNamara, Connellsville, Pa., assignor to Capstan Glass Company, Connellsville, Pa., a corporation of Delaware Application February 21, 1928. Serial No. 255,877

15 Claims. (Cl. 214—1)

The present invention relates to transferring mechanisms and more particularly to a transferring mechanism for glass vessels and the like.

In the manufacture of glass containers such as tumblers, jars and the like, the ware may be either pressed or pressed and blown. In either instance, it is necessary to remove the containers or vessels from the fabricating machine before they are completely cooled and while they are in a more or less plastic condition. To facilitate this in pressed ware a movable plunger extends through the bottom of the mold to raise the vessel out of the mold when it reaches the proper station. In the past, operators have and still do utilize manual grippers adapted to engage the hot vessels and remove them from the machine to a suitable conveyor. The pressure applied to the plastic containers by the grippers changes the container from the true circle, which is quite a nuisance in subsequent sealing operations. Then too, the grippers are frequently used as a handy tool for general purposes. They fall on the floor and accumulate dirt which adheres to the container and is baked thereon.

Devices have been designed to eliminate the constant attendance of an operator for this purpose by automatically removing the vessels to a conveyor. Such devices have been very complicated in structure and comparatively expensive. In addition they are only partially successful due to the breakage and deformation of ware. The vessels necessarily have to be gripped with sufficient pressure to hold them securely and in doing this the mechanical grippers frequently change the shape of the vessel considerably as described above with respect to manual grippers.

Due to the fact that most containers are utilized for the packaging of foods and canned goods and must therefore be sealed by suitable metallic closures, it is necessary that the shape of the mouth of the receptacle conforms substantially to a standard; otherwise in the sealing operation the vessels will be broken and the contents spoiled. Even if the vessels succeed in going through the sealing machines without damage, subsequent leaks in the seal are likely to be formed by the defective ware and spoiled packages result. Grippers which engage the containers only partially on two sides thereof change the shape of the plastic vessels and necessitate rejection of a substantial percentage of the ware and occasion difficulty in sealing. Many caps are sealed to the side wall of the containers and with out-of-round containers, such seals cannot be properly made. Devices heretofore have not succeeded in overcoming these objections.

In many instances, particularly with pressed ware, the mouth of the receptacle is substantially larger than the bottom thereof. Where such vessels are placed upon conveyors in upright position they frequently topple over due to jars incident to their movement and due to their small bottoms. Inversion thereof is therefore desirable. Transferring devices heretofore have attempted in various ways to secure this advantage but the resulting constructions were extremely complicated and presented difficulties which offset their advantages.

An object of the present invention is to simplify materially the devices used heretofore for transferring vessels from fabricating machines to conveyors.

Another object of the invention is to prevent deformation and breakage of vessels in transferring operations due to improper gripping thereof.

Another object of the invention is to provide a holding means for transferring mechanism which applies balanced forces to the container to eliminate deformation of same.

Another object of the invention is to provide a device adapted securely to hold vessels by engagement with one side only thereof.

A further object of the invention is to provide a vessel handling mechanism readily applicable to existing machines which will accommodate vessels varying materially in both shape and size and transfer them to a conveyor running at any desirable level.

Other and further objects of the invention will be apparent from the following description of the preferred embodiment and various advantages not referred to herein will occur to one skilled in the art upon employment of the invention in practice.

A preferred embodiment has been chosen for purposes of illustration and description and is shown in the accompanying drawings, wherein Fig. 1 is a top plan view of the device applied to a common form of mold table for manufacturing glass vessels and the like;

Fig. 2 is a side elevational view of the device shown in Fig. 1 with the conveyor mechanism omitted for simplicity, the view being taken along line 2—2;

Fig. 3 is a side elevational view of the device with the takeout arm in position to deliver a vessel to the vertically movable support, the mold table being omitted for simplicity;

Fig. 4 is a diagrammatic view illustrating in dotted lines the movement of the vessel from the mold table to the conveyor;

Fig. 5 is a perspective view of a form of vessel engaging jaw differing slightly from that shown in Fig. 1;

Fig. 6 is a perspective view of another form of vessel engaging jaw;

Fig. 7 is a sectional view along the line 7—7 of Fig. 6;

Fig. 8 is a sectional view illustrating the attachment of the takeout arm to the vertical column; and Fig. 9 is a vertical sectional view illustrating details of the mounting of the takeout arm.

The present embodiment of the invention is shown applied to a common form of fabricating machine for glassware having suitable molds in which the plastic glass is pressed to form containers. The application of the device to such a machine is illustrated as one of many ways of applying the invention. The device is adapted to remove fabricated glass articles such as tumblers from the molds, while in a somewhat plastic condition, and deliver them in inverted position to a conveyor adjoining, generally at a substantially different level. Such operations are entirely automatic and do not in any way slow up the operation of the fabricating machine, but operate in timed relation therewith. The vessels are securely held during the transferring operations and at the same time the pressures applied are balanced, thereby eliminating any tendency toward deformation or change in the contour thereof.

Referring to the drawings, there is shown a fabricating machine 1 for molded articles such as glass vessels and the like, with certain parts broken away for clearness. A rotatable mold table 2 is shown as a part of the fabricating machine and is preferably a common form of intermittently operated table with a series of molds 4 thereon. Since this application is not concerned particularly with the molding of the articles, the pressing and pouring mechanisms have not been illustrated.

In Fig. 2 a mold is shown in section at the station where the present take-off is operative. The mold may be of any desired form but preferably comprises an upper member 5 with a plunger 6 having a head at the upper end thereof fitting into and closing the bottom of the mold. The molded vessel 7, when it reaches the take-off station, is raised upwardly by means of a pneumatic cylinder 9 which operates a piston rod 10 to engage the lower end of the plunger 6 to raise the vessel out of the mold as shown in dotted lines in Fig. 2.

An arm 11 is mounted on the piston rod 10 and adapted to slide upon the vertical threaded rod 12 until it reaches its upper limit controlled by the nuts 13. By adjusting the nuts 13 the position of the vessel raised from the mold may be regulated. Suitable air tubes 14 are attached to the upper and lower ends of the cylinder respectively for operating same. It will be understood that when the table is stopped with a mold in the position shown in Fig. 2, with the plunger 6 over the piston rod 10, air is admitted to the lower end of the cylinder to raise the tumbler from the mold. Thereafter, air is admitted to the upper end of the cylinder to lower the plunger. This operation is repeated as successive molds stop at the station.

During the next step in the operation the raised vessel is moved to an adjoining conveyor. For this purpose there is mounted adjacent the mold table, a column 16 having an elongated rotatable sleeve 17 adapted to rotate about the vertical shaft 18. At the upper end of the column there is provided a horizontal arm 19 comprising a hollow tube 20 threaded into the sleeve 17. Rotatably mounted on the tube 20 is a telescoping tube 21 formed of two parts threaded together to form a seat for the enlarged end 22 of the inner tube. A vessel engaging jaw 23 is suitably attached to the free end of the arm. The inner end of the tube 21 has a star wheel or gear 24 formed thereon to engage the pegs 25 threaded into the stationary collar 26 on the column 1. As the vertical sleeve 17 rotates about the shaft 18 the horizontal arm 19 and jaw 23 oscillate over the mold table.

For effective operation the movements of the jaw 23 must be in timed relation with the mold table. This may be secured in any suitable manner by means of the arm 28 and link 29. A separate pneumatic cylinder may be used for this purpose or the link 29 may be connected directly with the mechanism commonly used for intermittently rotating the mold table. Excellent results may be attained in either instance but the use of a separate pneumatic cylinder gives a more flexible unit.

While the jaw 23 may be of various forms, it is here shown comprising a curved face member 31 having a series of apertures 32 therein. The jaw may be entirely of metal as shown in Fig. 1, in which case the hot vessels soon heat the jaw member to the desired temperature so that the metal does not impair the vessels. If desired the face of the jaw may be provided with a pad of heat insulating material 34, as shown in Fig. 5. Such a pad gives a cushion against which the vessel may rest and at the same time prevents the heat from being conducted away too rapidly. Asbestos has been found to be very satisfactory for this purpose but other types of material may be used with excellent results.

Another form of jaw is illustrated in Fig. 6 wherein the face of the jaw has a pad 34 with a series of pockets 39 formed about the apertures 32. This may be accomplished by having vertical fins 40 and horizontal fins 41 as shown. It is not necessary, with either of these jaws, for the vessel to fit snugly against the entire face of the jaw. The pull from a relatively few of the apertures 32, caused by suction from pipe 38, as described hereinafter, will hold a vessel firmly in position.

Back of the pad 34 and communicating with the apertures 32 in each instance is a chamber 35 connected by means of the tube 21 and the hollow shaft 18 to a vacuum line 38. Preferably the vacuum is made effective upon the vacuum chamber 35 as the vessel 7 is raised from the mold which causes the apertures 32 to hold the vessel firmly in position when the jaw engages it. Since the external atmosphere presses the vessel firmly against the curved portion of the jaw, there is no tendency to deform the vessel. On the other hand, there is a tendency to keep the vessel in its cylindrical shape.

As the arm 28 oscillates through the arc shown in Fig. 1, the jaw 23 engages the vessels which are consecutively raised as shown in Fig. 2 and moves them toward the conveyor. During such movement the gear 24 engages the pegs 25 and rotates the jaw in a clockwise direction to invert the vessel simultaneously with the horizontal movement thereon. Preferably the gear 24 does not engage the pegs 25 until after the jaw engages the vessel, in this manner the jaw is free to adjust itself to the vessel at the time of engagement therewith.

To receive the vessels and to place them on a conveyor, there is provided a vertically movable support 44 mounted on a piston rod 45 of a pneumatic cylinder 46. The air tube 47 leading to the upper end of this cylinder may be connected to the tumbler press cylinder so that the support 44 will be lowered to its proper position when the jaw has deposited a vessel thereon. The tube leading to the lower end of the cylinder 46 may be connected through a valve which is actuated by the trip 43 when the vessel pusher reaches its return position, so that normally the support 44 will be in its upper position. It will be understood that any other suitable mechanism may be utilized for giving the desired movement to the support 44 in timed relation with the movement of the jaw and mold table. A suitable arm 48 may be provided to slide upon the threaded rod 49 as described hereinbefore with respect to the cylinder 9. The lock nuts 50 determine the upper limit of the vertically movable table by engagement with the arm 48.

A suitable table 51 is provided having a seat therein to receive the movable support 44 so that the upper surface thereof will be flush with the surface of the table when the support is in its lowest position. A conveyor 52 is at the same level as the table 51, and hence the vessels will slide from the table to the conveyor. A suitable pusher is provided for this purpose comprising an arm 54 attached to a cylinder rod 55 and movable along the guides 56. The arm 54 reciprocates back and forth to slide the vessels from the lowered support 44 on to the conveyor 52.

The air tubes 58 and 59, connected to the inner and outer ends respectively of the cylinder 57, may be controlled in any suitable manner but preferably the tube at the inner end is controlled by means of a trip at the lower end of the cylinder 46. This trip may comprise a pin 60 extending into the lower end of the cylinder with its other end in the form of a valve held in its upper position by means of a spring 61. As the vertically movable table 44 moves to its lowest position the stem 60 is pressed downwardly and air is admitted through the pipe 58 to the inner end of the cylinder 57. The outer end of the cylinder may be adapted to be tripped directly when the pusher 54 is at its extreme position with the vessel on the conveyor. Any other suitable means may be utilized for operating the cylinder to achieve the action described above.

In some instances the pressing mechanism may fail to operate properly and a gob of glass may be left in the molds; and again, the takeout might, for some reason or other, fail to operate. In either instance, a molded article or a gob of glass will be left in the mold. If a mold returns with an article in it and additional glass is poured into the mold, the resulting article is, of course, defective. To eliminate this, there is provided herein a pneumatic cylinder 64 having a rod 65 with a curved member 66 at the end thereof adapted to move over the glass molds at the station next following the take-off station. A pneumatic mechanism similar to that at the take-off station is adapted to raise the plunger 6 for removing glass or gobs of glass from the mold. While in raised position, the curved member 66 brushes over and knocks off anything which may have been left in the mold. If nothing has been left in the mold the movement is a mere idle one.

In operation, the mold table 2 is operated intermittently as heretofore and stopped with consecutive molds positioned over the pneumatic cylinder 9. As each mold becomes properly positioned the cylinder 9 operates to raise the plungers 6 elevating the vessel 7 to the dotted position shown in Fig. 2. At this time the jaw 23 is oscillated by means of the sleeve 17, arm 28, and link 29 to engage the raised vessel. At the time of the engagement the vacuum through the tube 38 operates to pull the vessel against the surface of the jaw and hold it in that position while the jaw 23 continues to move. After engagement with the vessel, the gear 24 on the end of the horizontal arm supporting the jaw engages the pegs 25 to rotate the jaw. The vessel is moved from the position A on the plunger 6 to the position B over the table 44, where it has been turned through an angle of 180 degrees, as shown in Fig. 4. At this point the vacuum is rendered ineffective and air is permitted to enter to release the vessel. The movable table 44, normally in its upper position, is at the proper level to receive the vessel and is operated through the cylinder 46 to lower the vessel to the position C on the stationary table 51. As soon as the vessel clears the jaw 23, the jaw is free to move backward to the position for engaging another vessel. When the vessel has been lowered to the level of table 51, the pusher 54, operated by the cylinder 57, moves the vessel to the position D on the moving conveyor 52. The pusher when it reaches the end of its stroke, is automatically returned and in the meantime the jaw 23 has been returned to its initial position through the link 29 and the table has been moved up to another station.

The safety device comprising the air cylinder 64 operates upon each mold at the station next following the take-off station where the plunger 6 is raised as noted above and the curved member 66 is oscillated over the plunger to knock off any glass remaining in the mold. This cycle is repeated each time the mold table presents a new mold.

It will be seen that the embodiment herein described and the invention contemplated is simple in construction and effective in operation to remove vessels from the commercial types of fabricating machines, and particularly from intermittently operated mold tables. The vessel engaging member, having but a single jaw, cannot deform the plastic glassware. The pressures applied to the vessel for holding it in position are substantially balanced and hence there is no tendency to deform the finished articles. The jaws being fixed in the machine are not likely to accumulate dirt and hence the articles remain clean. The present mechanism eliminates the costly complicated mechanisms devised for the same purpose heretofore. At the same time the results achieved are many times more satisfactory than with any machine on the market. The parts of the mechanism may be readily obtained from the ordinary glass plant and can be constructed without excessive cost. Skilled operators are not necessary in the use of the apparatus or in the construction thereof. Further, the machine is rugged in construction and is fully capable of withstanding the rough usage to which it may be subjected.

As various changes may be made in the above embodiment, without departing from the spirit of the invention, it is to be understood that all matter herein is to be interpreted as illustrative and not in a limiting sense.

Having thus described my invention, I claim:

1. In a device for handling articles such as glass containers delivered consecutively by a glass fabricating machine, the combination of a movable support, a transfer arm having a suction head for engaging a container, inverting it and placing it upon said support, means for moving automatically said support vertically after each vessel is deposited thereon, and means for removing the vessel from said support in its second position.

2. In a device of the class described, the combination of a support for a container movable in a substantially vertical direction, means for engaging the side of the container, devices for oscillating said means in a horizontal plane to move containers from successive molds to said support, mechanism for rotating said means about its horizontal axis during said oscillations to turn the open ends of the containers down, means for moving said support to another position, and mechanism for removing the container from said support when in said second position.

3. In a device for handling glass containers delivered by a glass machine, the combination of a support movable in a vertical direction, pneumatic means for raising and lowering said support, adjustable means for determining the uppermost position of said support, and means for determining the lowermost position of said support whereby a container may be moved from the support in one of its extreme positions to a conveyor at substantially the same level.

4. In a device for handling glass containers, the combination of a support, a transferring mechanism having a suction head for engaging containers presented successively, said transferring mechanism being adapted to deposit said containers on said support, means for inverting said suction head to deliver containers in inverted position, means for moving said support vertically, and means for moving said containers from said support onto a conveyor moving adjacent the support.

5. In a device of the class described, the combination of a mold table having molds thereon, a vertically movable support, adjustable means for determining the uppermost position of the support, means for determining the lowermost position of the support, a transferring mechanism having a suction head associated therewith for engaging containers delivered by the mold table and transferring said containers to said support while the support is at substantially the level of the mold table, pneumatic means for automatically moving said support to another position at a different level to facilitate removal of containers therefrom, and devices for removing said containers from said support while it is in its second position.

6. In a device for handling glass containers, the combination of a movable support, a conveyor at a substantially different level, a vessel transferring mechanism having a suction head for engaging and holding a container, said transferring mechanism being adapted to invert the container and place it upon said support, means for moving said support vertically to compensate for the difference in level between the transferring mechanism and conveyor, and means for removing the vessel from said support to a conveyor.

7. In a device for handling glass containers, the combination of a movable support for a container, a suction head for engaging the container and holding it by suction, devices for moving said suction head to engage containers delivered from successive molds and transfer said containers to said support, and mechanism for rotating said suction head to rotate the containers about an axis parallel to the plane of the transfer movement thereof during the transfer of said containers to turn the upper ends of the containers down.

8. In a device for removing containers from a mold table or the like, the combination of an arm having pneumatic means thereon for engaging and holding a container, devices for moving said arm to engage containers and to continue the movement thereof to transfer the containers from one position to another, and means for revolving said arm about its longitudinal axis to turn the container over so that the container may be delivered with its larger end down.

9. In a device for removing containers from a mold table and the like, the combination of an arm having a rigid curved surface for engaging the outer side wall of a container, said curved surface having an aperture therein whereby a partial vacuum may be created between said surface and the side wall of a container, devices for moving said arm to transfer a container from one position to another, a rack and pinion for rotating said arm about its longitudinal axis to turn the open end of the container down and means for receiving the inverted container and for moving it out of the path of the arm.

10. In a device of the class described, the combination of a mold table having molds thereon for fabricating glass vessels, a vertically movable support for a vessel, adjustable means for determining the extreme upper movement of said support, means for determining the lower movement of said support, transferring mechanism automatically operative for moving the vessels raised from the molds to said support, and pneumatic means automatically operative for moving said support vertically to the level of said transferring mechanism as each vessel is delivered, to receive the delivered vessel.

11. In a device of the class described, the combination of a support for a vessel movable in a vertical direction to receive a container at one level and transfer it to another predetermined level, a transferring mechanism having an oscillating arm with a suction head thereon for engagement with the exterior surface of a container, means for rotating said arm about its longitudinal axis during movement, and means for rendering said suction head ineffective at a predetermined position to deposit said vessel on said movable support and means for moving the support downward prior to the backward movement of the arm.

12. In a device for handling glass containers and the like, the combination of a transferring mechanism having a substantially vertical surface for engagement with a container, means for producing a vacuum between the container and said surface to hold the container thereagainst, and devices for moving said surface in a substantially horizontal plane to engage a container and continue the movement thereof and means for inverting said surface to turn down the open end of the container held thereby.

13. In a device for handling articles such as glass vessels, the combination of a support movable in a substantially vertical direction to receive containers deposited periodically thereon, adjustable means for determining the upper position of said support, means for determining the lower position of said support, a transferring mechanism for engaging a vessel and placing it upon said support, pneumatic means for automatically changing the vertical position of said support to substantially the level of a conveyor after each container is placed thereon, and means for sliding said containers successively from the support toward said conveyor.

14. In a glass container transferring mechanism, an upright column, an arm pivoted to rotate in a substantially horizontal plane about said column, a suction head at the end of said arm having apertures therein adapted to engage and support a container, a gear on said arm, and means in the path of said gear to rotate the gear and said arm when said arm is oscillated to transfer vessels, a vertically movable support, means for raising said support to receive a vessel from said transfer arm and for lowering said vessel to a substantially different level and means for transferring said vessel from said support to a conveyor.

15. In a device for handling articles such as glass containers delivered consecutively by a glass fabricating machine, the combination of a movable support, a transfer arm having means thereon for engaging a container, inverting it and placing it upon said support, means for automatically moving said support vertically after each vessel is deposited thereon, and means for moving the vessel from said support in its second position.

WILLIAM L. McNAMARA.